United States Patent
Murdoch et al.

(10) Patent No.: US 7,279,685 B2
(45) Date of Patent: Oct. 9, 2007

(54) RADIATION DETECTOR

(76) Inventors: Trevor Murdoch, 711 Altura Dr., Cocoa, FL (US) 32927; David William Reed, 1952 Thesy Dr., Melbourne, FL (US) 32940

( * ) Notice: Subject to any disclaimer, the term of this patent is extended or adjusted under 35 U.S.C. 154(b) by 196 days.

(21) Appl. No.: 11/239,435

(22) Filed: Sep. 22, 2005

(65) Prior Publication Data
US 2007/0205370 A1    Sep. 6, 2007

(51) Int. Cl.
*G01T 1/20* (2006.01)
(52) U.S. Cl. ............... 250/369; 250/252.1; 250/361 R; 313/93
(58) Field of Classification Search ............... 250/369, 250/252.1, 361 R; 313/93
See application file for complete search history.

(56) References Cited

U.S. PATENT DOCUMENTS

| | | | | |
|---|---|---|---|---|
| 4,186,307 A | * | 1/1980 | Tanaka et al. | 250/363.02 |
| 5,003,502 A | * | 3/1991 | Davis | 250/259 |
| 5,109,227 A | * | 4/1992 | Godfrey | 340/600 |

OTHER PUBLICATIONS

HV resonant converter for photomultipliers tube bases; Rivetta, C.; Foster, G.; Hansen, S.; Nuclear Science Symposium and Medical Imaging Conference, 1992., Conference Record of the 1992 IEEE Oct. 25-31, 1992 pp. 438-440 vol. 1; Digital Object Identifier 10.1109/NSSMIC 1992.301285.*

* cited by examiner

*Primary Examiner*—David Porta
*Assistant Examiner*—Jessica L Eley

(57) ABSTRACT

The invention is a digital radiation detector utilizing the stable timing functions of a microcontroller or plurality of microcontrolling devices to perform three independent functions. A first timer generates a continuous square wave output that is fed through a class B amplifier to yield a stable, drift-free power supply for a connected radiation sensor. A second timer is used as an event counter for counting the processed pulses coming from the radiation sensor. A third timer acts as a real time clock generating a one-second interrupt for quantifying the number of counts per second. The number of counts per second can be communicated as raw data through a communication interface or presented as a number of audible or visual displays.

24 Claims, 4 Drawing Sheets

RADIATION DETECTOR

BACKGROUND OF THE INVENTION

1. Field of the Invention

The present invention relates to devices used to detect radiation. Specifically, the invention concerns apparatus and circuits that are used to detect and measure the radiation released from a radiological device, a so called dirty bomb, or associated with radioactive fallout following a nuclear or thermonuclear detonation.

2. Description of the Prior Art

Terrorist threats to the safety and stability of civilized countries have become an unfortunate reality of the modern era. The devastating attack upon the world trade towers in New York City clearly demonstrated that the nature of terrorist attacks has shifted in recent years. Formerly, modestly organized insurgent groups limited their attacks to small-scale targets, typically motivated by political interest, religious extremism, or the desire to release their captured cohorts. Today's terrorists are highly organized, well financed, multi-national organizations bent on the broad destruction of capital assets and the senseless mass killing of innocent noncombatants.

Modern terrorists have enbarked on a campaign to obtain and use weapons of mass destruction, or WMDs. One such WMD is the radiological device or 'dirty bomb'. A dirty bomb consists of radiological material, such as low-grade uranium, and a disbursement means for distributing the radiological material over a large area, thereby indiscriminately exposing a population and inducing radiation sickness. In a typical dirty bomb, minimally processed uranium is packed around a core of conventional high explosive. Once the high explosive is detonated, a cloud of finely particulate radiological material is distributed over a moderately large area. Alternatively, the disbursement means may be a low-flying aircraft distributing fine particulates of radiological material.

A second WMD of concern is the nuclear or thermonuclear bomb. During a nuclear bomb detonation, nuclear fission is induced in highly processed uranium and/or plutonium. During a thermonuclear bomb detonation, nuclear fission is itself employed as a primer for the thermonuclear fusion of hydrogen isotopes such as deuterium or tritium. During both nuclear and thermonuclear detonations, enormous amounts of energy are released in the form of a destructive shock wave and fireball. Radiological material is ejected over a broad area as nuclear fallout causing radiation sickness long after the initial destruction. However, while nuclear and thermonuclear devices combine radiation poisoning with immediate, large-scale capital destruction, they are extremely complex devices requiring highly processed material, such as plutonium-238, and considerable technical expertise to construct.

Of the two WMDs identified above, the dirty bomb is considered the greatest potential threat due to the relative ease with which low-grade radiological material can be obtained and the low-technology associated with its disbursement means. Dirty bombs have the desired effect of creating terror to the public at large as well as incurring tremendous cost and clean up effort to make an affected area safe again as defined by government agencies such as the United States Environmental Protection Agency.

Accurate means for both detecting and quantifying the presence of radiological material are not known in general practice. Prior art detectors are analog devices based on Geiger counter techniques. Such Geiger counters are notoriously imprecise due to thermal drift instability in the circuit design. What is needed is a more precise, digital counter capable of accurately defining the normal background level at the installation and an elevated level due to the introduction of radioactive material. For a digital counter to work properly, a novel stable power supply is required since any drift in voltage may cause false alarms.

SUMMARY OF THE INVENTION

The present invention is a novel, digital radiation detector utilizing the stable timing functions of a microcontroller or plurality of microcontrolling devices to perform three independent functions. A first timer generates a continuous square wave output that is fed through a class B amplifier to yield a stable, drift-free power supply for a connected radiation sensor. A second timer is used as an event counter for counting the processed pulses coming from the radiation sensor. A third timer acts as a real time clock generating a one-second interrupt for quantifying the number of counts per second. The number of counts per second can be communicated as raw data through a communication interface or presented as a number of audible and/or visual displays.

DETAILED DESCRIPTION OF THE INVENTION

Figure 1:
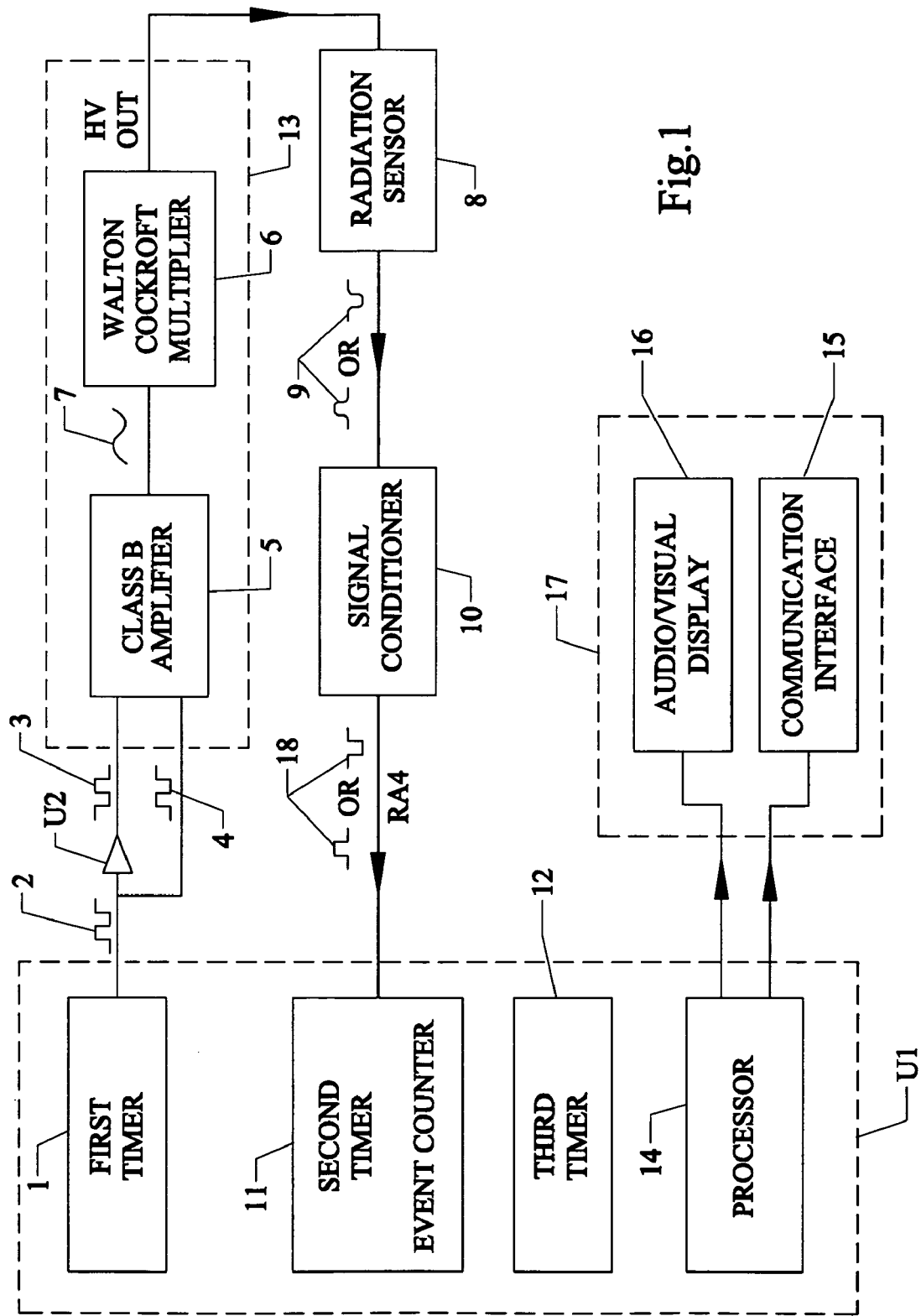
FIG. 1 shows a functional block diagram of the present invention.
Figure 2:
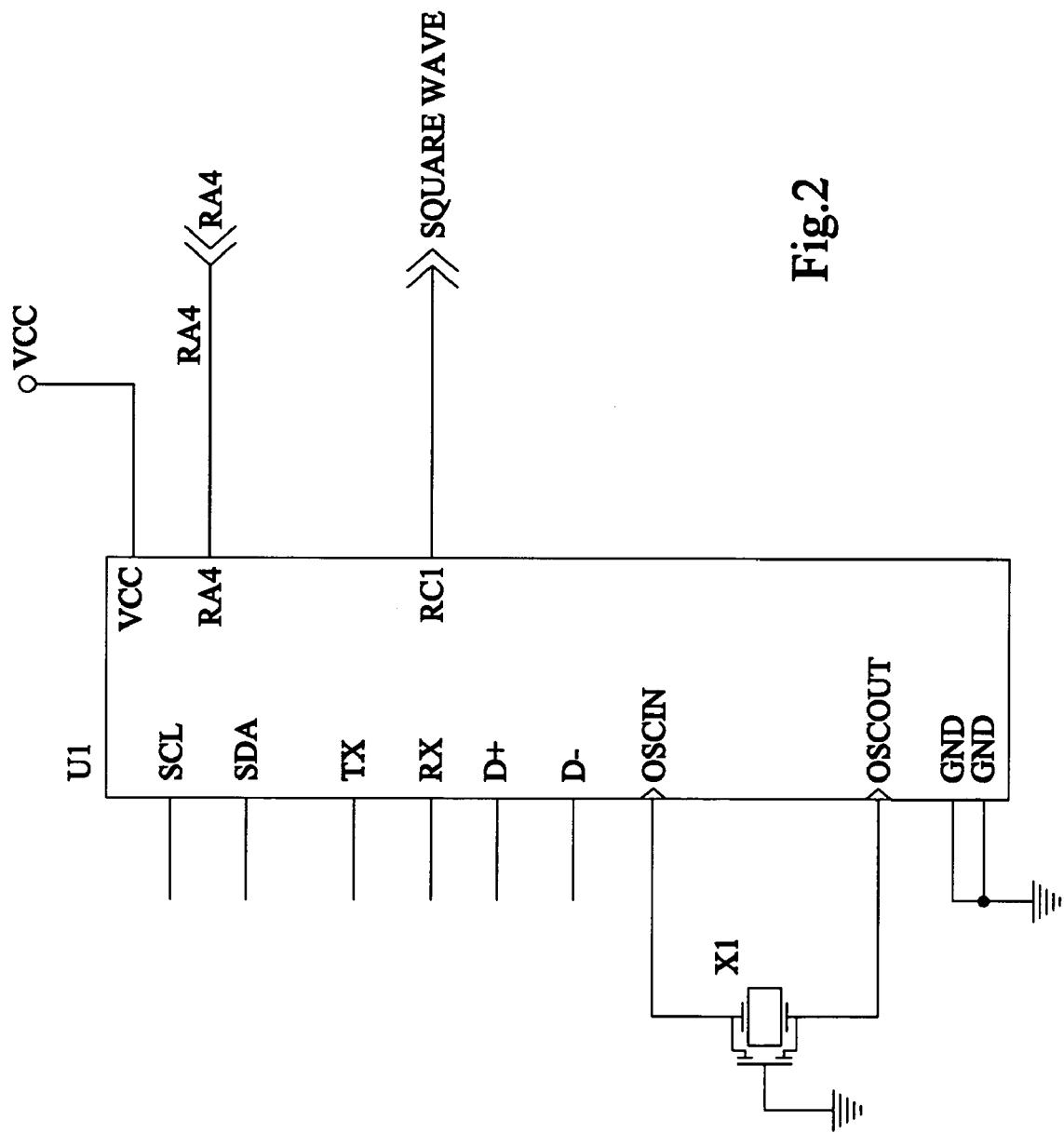
FIG. 2 is a schematic diagram of the timing/controller elements of the present invention.
Figure 3:
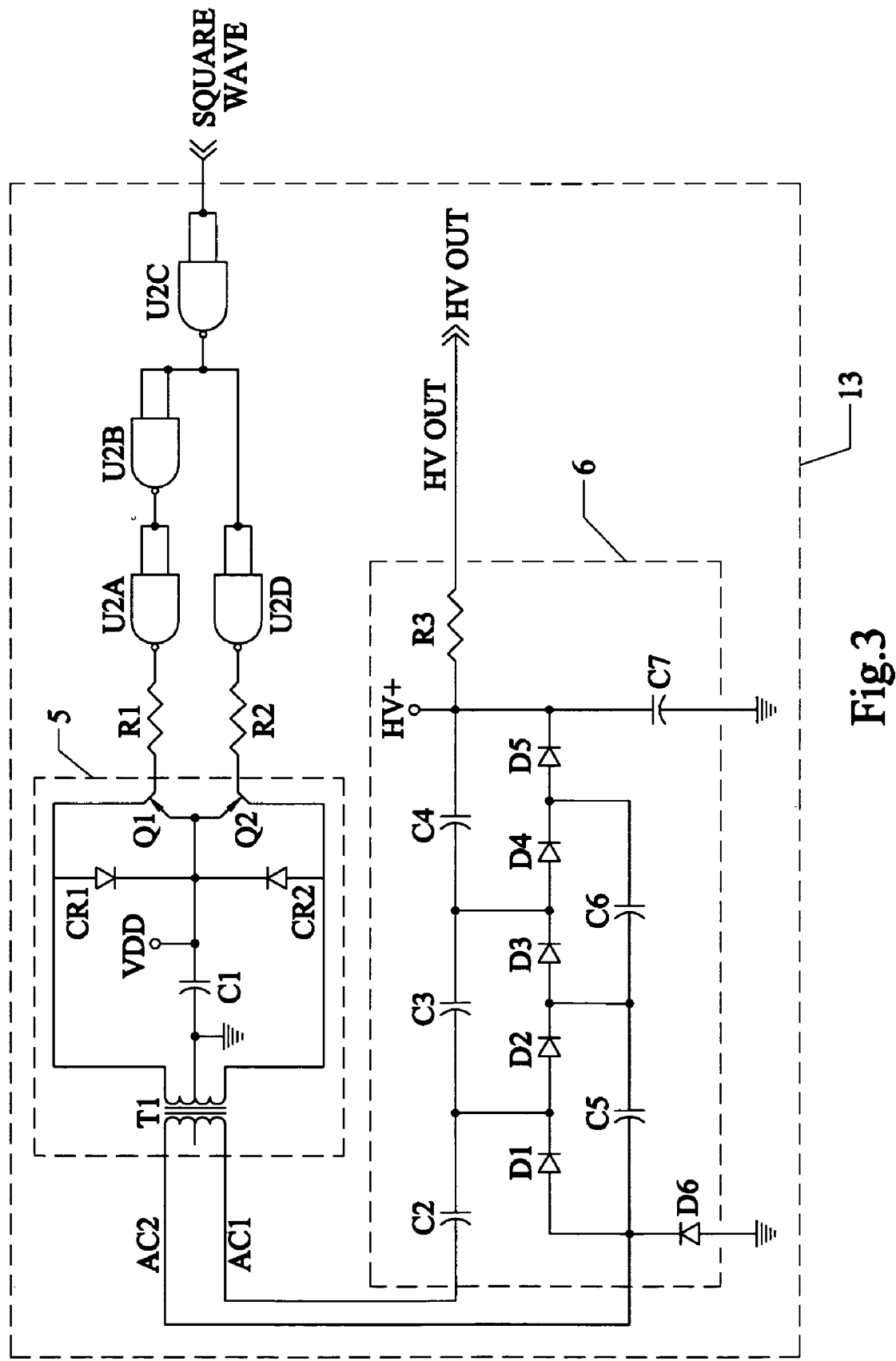
FIG. 3 is a schematic diagram of the stable power supply elements of the present invention.
Figure 4:
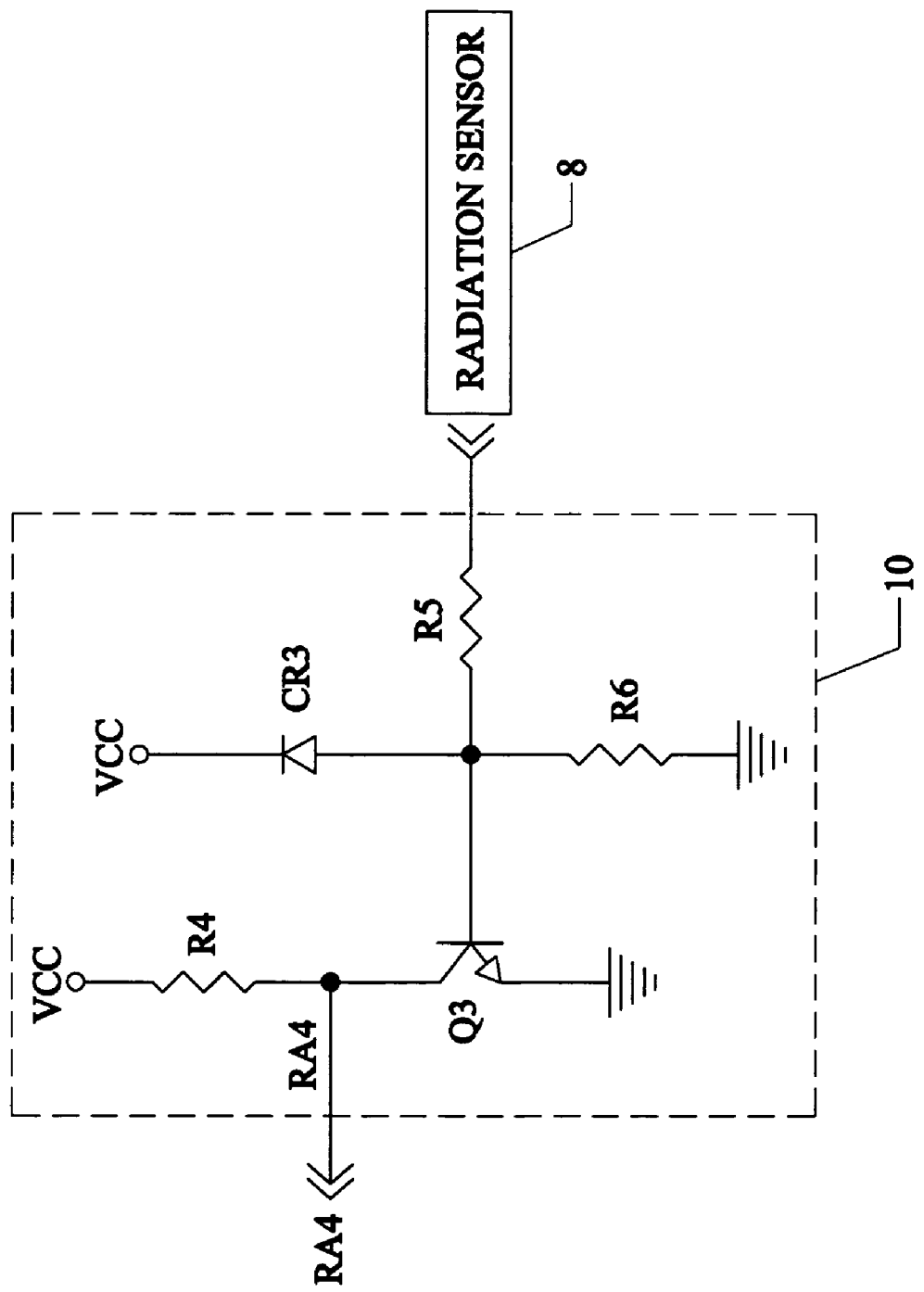
FIG. 4 is a schematic diagram of the pulse conditioning circuit of the present invention.

With reference to FIGS. 1-4, microcontroller U1 comprises a plurality of timers each with different functions. Microcontroller U1 uses an external crystal X1 to produce the master clocks for these timers. From this, the clock signal of first timer 1 is divided down to produce an initial square wave 2 with a frequency of less than 9 kHz, and most preferably with a frequency in the range of 1.5 kHz and 1.75 kHz, in order to reduce potential electromagnetic interference with other nearby devices not associated with the detector. Initial square wave 2 is fed to power supply 13 wherein initial square wave 2 is buffered and inverted by inverter/buffer U2 to produce first square wave 3 and second square wave 4 that are 180 degrees out of phase from each other. Each of first square wave 3 and second square wave 4 then feeds to an appropriate transistor Q1 and Q2 configured as a Class B amplifier 5 driving push/pull transformer T1.

A Class B amplifier is preferable to other amplifier types for this application due to the stability of the output and the lack of thermal drift. Class A amplifiers require excessive power to produce the same level of drive. A self-oscillating Colpitts oscillator experiences thermal drift with aging and produces a wave of varying amplitude which is unacceptable in a sensitive radiation detector.

The output of transformer T1 is a sine wave 7 of a much higher voltage which is fed through a Walton Cockroft multiplier 6 made up of diodes D1 through D6 and capacitors C2 through C7 of which C7 acts as a final filter capacitor. This produces a high voltage direct current (DC) which is required by radiation sensor 8.

Radiation sensor 8 may consist of a Geiger-Müller tube, a photomultiplier tube with a scintillation crystal, or other radiation-sensing elements known in the art of radiation detection. All radiation sensors known in the art require the stable high voltage fed by first timer 1.

Radiation sensor 8 produces an electrical signal pulse 9 when struck by a nuclide that has been emitted from a radioactive material. In the case where radiation sensor 8 consists of a Geiger-Müller tube, pulse 9 is output from the cathode of the tube. In the case where radiation sensor 8 consists of a photomultiplier tube with a scintillation crystal, pulse 9 is output from the anode of the tube. The present invention works equally well with pulses output from these or other devices known in the art.

Signal conditioner 10 attenuates the amplitude of raw pulse 9 and squares off the ascending and descending voltage of raw pulse 9 to produce a clean voltage change that is identifiable by microcontroller U1 as a countable radiological event. Raw pulse 9 enters signal conditioner 10 via resistor R5 where it is divided down by resistor R6 and clamped by diode CR3. The junction of diode CR3, resistor R5, and resistor R6 is fed to the base of NPN transistor Q3 which has a pull-up resistor R4 from its collector. The collector of transistor Q3 and the junction of resistor R4 is fed as conditioned pulse 18 to the Schmidt trigger input RA4 of microcontroller U1 which clocks the input to second timer 11. Second timer 11 acts as an event counter and is incremented upon every conditioned pulse 18.

Third timer 12 receives its clock signal from external crystal X1. This clock signal is divided down within third timer 12 to produce a software interrupt at predetermined, convenient intervals. Typically the time interval between interrupts is one-second, although other values such as ten seconds, one minute, or one hour may be equally employed. Alternatively, by using an external real time clock (not shown), it is possible to generate an equivalent hardware interrupt without using microcontroller U1. The hardware or software interrupt, when serviced, will read the value of the software register located in second timer 11 and subsequently reset the register in second timer 11 to zero. This register value correlates to the number of pulse counts per time interval, and hence, the number of events per time interval. Counts per second is typically the value of interest.

First timer 1, second timer 11, and third timer 12 may be efficiently run using a single microcontroller. Suitable types include, for example, the Microchip™ PIC 16C or 18F series. However, it may also be advantageous to use a plurality of microcontrollers to perform these functions in parallel. In one such embodiment, multiple, remotely-located radiation sensors 8 might each include its own first timer 1 and associated power supply circuitry 13 while second timer 11 and third timer 12 might reside together in a single master microcontroller, which is in turn connected to all remotely-located radiation sensors 8. In order to function properly, first timer 1, power supply 13, radiation sensor(s) 8, signal conditioner 10, and second timer 11 must be capable of passing a signal between each other either through hard or wireless interfaces.

The number of counts per time interval 17 is provided as an output from microcontroller U1. Counts per time interval 17 may be outputted as raw data through one or more communication interface 15. The raw data may require additional processing by processor 14. Processor 14 function may be performed within microcontroller U1 or by a separate stand-alone component. Communication interface 15 may comprise RS-232, RS-485, universal serial bus (USB), 10/100 Mbps Ethernet, radio frequency (RF), IEEE 802.11 wireless fidelity network (WiFi), infra-red data (IRD), Inter-Integrated Circuit-bus ($I^2C$-bus), IEEE 1394 (Firewire) or other interfaces common in the art of electronic data communication.

Alternatively, the number of counts per time interval 17 may be further processed by processor 14 and presented through one or more audio/visual display 16. Again, processor 14 function may be performed within microcontroller U1 or by a separate stand-alone component. In a first embodiment, the number of counts per time interval 17 may be processed to illuminate a series of colored light emitting diodes (LED) depending upon predetermined threshold values. The colors green, blue, yellow, amber, and red are commonly used to represent ascending threat levels based on such predetermined threshold values. In a second embodiment, the number of counts per time interval 17, using the same microprocessor U1 or another microprocessor, may be processed using a predetermined threshold value to trigger a piezo-electric buzzer, another audible device such as a siren, or a visual device such as a strobing light. In a third embodiment, the number of counts per time interval 17 may be converted using the same microprocessor U1 or another microprocessor for output to a seven-segment LED display. In a fourth embodiment, the number of counts per time interval 17 may be processed using the same microprocessor U1 or another microprocessor for alphanumeric or graphical output to a liquid crystal display (LCD). In a fifth embodiment, the number of counts per time interval 17 may be integrated with the output from a video camera such that the number of counts per second is superimposed on the video signal using on-screen display (OSD).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A radiation detector comprising:
   at least one microcontroller;
   a timing crystal;
   at least one power supply;
   at least one radiation sensor; and
   at least one signal conditioner;
   wherein each said microcontroller further comprises at least one of a first timer, a second timer, and a third timer;
   wherein said crystal produces the master clocks for said first timer and said third timer;
   wherein said power supply further comprises a Class B amplifier and a Walton Cockroft Multiplier electrically connected in series;
   wherein said radiation sensor produces a raw electrical signal pulse when struck by a nuclide that has been emitted from a radioactive material;
   wherein said signal conditioner conditions said raw pulse to produce a conditioned pulse that is identifiable by said microcontroller as a countable radiological event;
   wherein said first timer, said power supply, said radiation sensor, said signal conditioner, and said second timer are capable of passing a signal between each other;

wherein the clock signal within said first timer is divided down to produce an initial square wave which is fed to the input of said power supply;
wherein the high voltage output of said power supply is fed to the input of said radiation sensor;
wherein said raw pulse output from said radiation sensor is fed to the input of said signal conditioner;
wherein said conditioned pulse output from said signal conditioner is fed to the input of said second timer;
wherein said second timer acts as an event counter that is incremented upon every said conditioned pulse;
wherein the clock signal within said third timer is divided down to produce an interrupt at a predetermined time interval;
wherein said interrupt, when serviced, reads the value of the software register located in said second timer thereby determining the number of counts per said time interval and resets said software register in said second timer; and
wherein said number of counts per said time interval is provided through an output from said microcontroller.

2. The radiation detector according to claim 1,
wherein said radiation sensor consists of a Geiger-Müller tube.

3. The radiation detector according to claim 1,
wherein said radiation sensor consists of a photomultiplier tube with a scintillation crystal.

4. The radiation detector according to claim 1,
wherein the frequency of said initial square wave is less than or equal to 9 kiloHerz.

5. The radiation detector according to claim 4,
wherein the frequency of said initial square wave is in the range of between 1.5 kiloHerz and 1.75 kiloHerz.

6. The radiation detector according to claim 1,
wherein said time interval is equal to one second.

7. The radiation detector according to claim 1,
wherein said number of counts per time interval is processed by a processor and presented through at least one communication interface.

8. The radiation detector according to claim 7,
wherein said processor is within said microcontroller.

9. The radiation detector according to claim 7,
wherein said communication interface includes at least one of RS-232, RS-485, universal serial bus (USB), 10/100 Mbps Ethernet, radio frequency (RF), IEEE 802.11 wireless fidelity network (WiFi), infra-red data (IRD), Inter-Integrated Circuit-bus ($I^2C$-bus), and IEEE 1394 (Firewire).

10. The radiation detector according to claim 1,
wherein said number of counts per time interval is processed by a processor and presented through at least one audio/visual display.

11. The radiation detector according to claim 10,
wherein said processor is within said microcontroller.

12. The radiation detector according to claim 10,
wherein said audio/visual display includes at least one of an illuminated series of colored light emitting diodes (LED), an audible device, a seven-segment LED, a strobe light, a liquid crystal display (LCD), and an on-screen display.

13. A radiation detector comprising:
at least one microcontroller;
a real time clock;
a timing crystal;
at least one power supply;
at least one radiation sensor; and
at least one signal conditioner;
wherein each said microcontroller further comprises at least one of a first timer and a second timer;
wherein said crystal produces the master clocks for said first timer;
wherein said power supply further comprises a Class B amplifier and a Walton Cockroft Multiplier electrically connected in series;
wherein said radiation sensor produces a raw electrical signal pulse when struck by a nuclide that has been emitted from a radioactive material;
wherein said signal conditioner conditions said raw pulse to produce a conditioned pulse that is identifiable by said microcontroller as a countable radiological event;
wherein said first timer, said power supply, said radiation sensor, said signal conditioner, and said second timer are capable of passing a signal between each other;
wherein the clock signal within said first timer is divided down to produce an initial square wave which is fed to the input of said power supply;
wherein the high voltage output of said power supply is fed to the input of said radiation sensor;
wherein said raw pulse output from said radiation sensor is fed to the input of said signal conditioner;
wherein said conditioned pulse output from said signal conditioner is fed to the input of said second timer;
wherein said second timer acts as an event counter that is incremented upon every said conditioned pulse;
wherein said real time clock produces an interrupt at a predetermined time interval;
wherein said interrupt, when serviced, reads the value of the software register located in said second timer thereby determining the number of counts per said time interval and resets said software register in said second timer; and
wherein said number of counts per said time interval is provided through an output from said microcontroller.

14. The radiation detector according to claim 13,
wherein said radiation sensor consists of a Geiger-Müller tube.

15. The radiation detector according to claim 13,
wherein said radiation sensor consists of a photomultiplier tube with a scintillation crystal.

16. The radiation detector according to claim 13,
wherein the frequency of said initial square wave is less than or equal to 9 kiloHerz.

17. The radiation detector according to claim 13,
wherein the frequency of said initial square wave is in the range of between 1.5 kiloHerz and 1.75 kiloHerz.

18. The radiation detector according to claim 13,
wherein said time interval is equal to one second.

19. The radiation detector according to claim 13,
wherein said number of counts per time interval is processed by a processor and presented through at least one communication interface.

20. The radiation detector according to claim 19,
wherein said processor is within said microcontroller.

21. The radiation detector according to claim 19,
wherein said communication interface includes at least one of RS-232, RS-485, universal serial bus (USB), 10/100 Mbps Ethernet, radio frequency (RF), IEEE 802.11 wireless fidelity network (WiFi), infra-red data (IRD), Inter-Integrated Circuit-bus ($I^2C$-bus), and IEEE 1394 (Firewire).

22. The radiation detector according to claim 13,
wherein said number of counts per time interval is processed by a processor and presented through at least one audio/visual display.

23. The radiation detector according to claim 22, wherein said processor is within said microcontroller.

24. The radiation detector according to claim 22, wherein said audio/visual display includes at least one of an illuminated series of colored light emitting diodes (LED), an audible device, a seven-segment LED, a strobe light, a liquid crystal display (LCD), and an on-screen display.

\* \* \* \* \*